UNITED STATES PATENT OFFICE.

THE RUMFORD CHEMICAL WORKS, OF PROVIDENCE, R. I., ASSIGNEES, BY MESNE ASSIGNMENTS, OF EBEN NORTON HORSFORD.

IMPROVEMENT IN PULVERULENT ACID FOR USE IN THE PREPARATION OF SODA-POWDERS, FARINACEOUS FOOD, AND FOR OTHER PURPOSES.

Specification forming part of Letters Patent No. 14,722, dated April 22, 1856; Reissue No. 2,597, dated May 7, 1867; Reissue No. 2,979, dated June 9, 1868.

*To all whom it may concern:*

Be it known that EBEN NORTON HORSFORD, of Cambridge, in the county of Middlesex and State of Massachusetts, has invented a new Pulverulent Acid for Use in the Preparation of Soda-Powders, Farinaceous Food, and for other Purposes; and it is hereby declared that the following is a full and exact description thereof, and of the mode of its preparation.

Carefully-washed and properly-burned bones, after being ground, are put into freshly-diluted oil of vitriol, with continual stirring, and in the following proportions: Five hundred pounds of the above-described ground bones, (sometimes called "bone-ash,") four hundred pounds of oil of vitriol, and one thousand pounds of water. These ingredients are stirred from time to time for about three days, when, ordinarily, the action will be completed, and the resultant products will be phosphoric acid, superphosphates, and sulphate of lime, or gypsum, with a small proportion of salts of magnesia and soda, in a paste-like mass, which may be mixed with flour or starch, or any farinaceous substance, while moist, in order more readily to render it pulverulent and to dilute the same, and permitted to dry slowly in the sun, or with aid of artificial heat not above 150° Fahrenheit, and pulverized; or it may be mixed with freshly-burned gypsum, and then dried in the sun or by artificial heat, and pulverized; or it may be mixed with stearine or other fatty bodies, and dried and pulverized; or the mass may be leached and the concentrated extract mixed with burned gypsum or stearine, and dried and pulverized; or it may be dried and pulverized without admixture, all of which modes have been found to give desirable results; but the method which, on the whole, I prefer is the following:

The above-described resultant products or paste-like mass is leached and the extract concentrated to 25° Baumé, and thereby I obtain a solution consisting of phosphoric acid and acid phosphate of lime, with slight traces of other salts substantially freed from the gypsum or sulphate of lime produced by the action of the oil of vitriol on the bone in an evaporating-pan of cast-iron lined with porcelain, or other proper vessel.

Ten gallons of this liquor are heated to boiling, and four pounds of perfectly-white bone-ash added, and the boiling continued till the whole is reduced to a little less than half its original bulk, when the concentrated liquid mass, containing in solution the added bone-ash, becomes pasty. The hot mass is then transferred to a convenient vessel to cool over night.

In the morning following add to this concentrated pasty mass seventy-six pounds of wheaten flour, which is to be mixed to a uniform paste. Then add sixteen pounds of potato starch, and most carefully mix again, after which it should turn out friable or in a state of division, such that it may be passed through a sieve with quarter-inch meshes. If not sufficiently dry it may be spread out a short time in the sun or in a room heated to 120° Fahrenheit.

The sifted mass should then be brought to a drying-chamber and spread out in trays until it becomes brittle at a temperature of from 115° to 120° Fahrenheit, when the heat may be raised from 130° to 150° Fahrenheit, and continued till the mass is thoroughly dried.

When dried the preparation may be pulverized, and then packed in close boxes or barrels to prevent the absorption of moisture.

It will be obvious to any practical chemist that the above-described processes of producing this pulverulent acid may be modified in various ways.

The proportions of the agents employed may be varied somewhat without materially affecting the result.

If a smaller proportion of sulphuric acid is employed the white-ground bones may be diminished.

Bone-black may be used instead of white-burned bones if the resultant product or pasty mass made therewith is leached. Corn-starch and other farinaceous substances, such as rice-flour or farina, may be substituted for wheat-flour and potato-starch.

The object is to obtain phosphoric acid in such form—that is, a pulverulent powder—so that it may be intimately mixed with dry alkaline carbonates, or other sensitive chemical compounds, without decomposing them, or entering into combination with them, except upon the addition of moisture, or the application of artificial heat. This requires that the phosphoric acid or acid phosphates be mixed with some neutral agent, as flour or starch, gypsum, &c., so that action of the acid shall be prevented while dry, and shall, when moisture or heat is applied, be prompt, thorough, and equally diffused.

Prepared as above described, the article is white, or grayish white, coarse-grained, and may be readily pulverized. This body, with water, may be stirred to an emulsion. It is exceedingly sour to the taste, but does not act, when mixed with dry alkaline carbonates, without the addition of water or the application of heat.

As a dry brittle powder, the article has the advantages of a pulverulent acid; may be handled, weighed, stirred, &c., as tartaric acid or cream-tartar; and, as a substitute for these and a variety of similar pulverulent acids and acid salts, it has many uses in manufacture. It may, among other uses, be mixed with dry alkaline carbonates—carbonate of potassa or carbonate of soda—and remain in this state without evolution of carbonic acid until moistened or heated, thus making it a substitute for cream-tartar and tartaric acid in the preparation of yeast-powder or baking-powder.

I am aware that acid phosphates have been used as fertilizers; but, because of the method pursued in their manufacture, their coarseness, dark color, and offensive impurities, they were totally unfit to be used in the preparation of food. I am also aware that acid phosphates and phosphoric acid, in a liquid or more or less viscid condition, have been prepared in the laboratory of the chemist; but neither of these forms of phosphoric acid or acid phosphates possessed the properties essential to the purpose for which I design to employ them.

The body which I have invented and above described is a form of acid phosphate of lime, or of mixed acid phosphate of lime and phosphoric acid, in which the phosphoric acid is the active and valuable constituent, free from the objectionable qualities of the above-mentioned bodies. It is a dry, fine, white, or nearly white, homogeneous powder, unobjectionable on account of odor, taste, or composition; is an essential and important element in healthful nutrition, and is suited to be employed as the acid ingredient in the preparation of self-raising farinaceous food.

In order to make the article possessing these qualities, and suited to this office, it is necessary that a powder should be made which can be not only evenly comminuted and diluted, but one which shall have so little affinity for the moisture of the atmosphere that it may be mixed with flour and bicarbonate of soda in the practical preparation of self-raising flour.

Although liquid and viscid, and more or less pasty or tough, phosphoric acid and acid phosphates were known as incidental forms in the preparation of various bodies of which phosphorus was a constituent. They were not pulverulent, nor were the means of making them so known. The manufacture I have invented accomplishes these results.

To illustrate the importance of these qualities, it may be stated that a vial of liquid phosphoric acid cannot be used as an ingredient of yeast or baking powders.

To meet the wants I have contemplated, the phosphoric acid must be a dry, fine, homogeneous powder, white or nearly white, and unobjectionable on account of smell or taste or healthfulness. It must be a dry powder, to permit it to be mixed with flour and bicarbonate of soda, and not evolve carbonic acid prematurely. If sticky, it would mix unequally, and, if moist, it would at once act on the bicarbonate of soda to decompose it and set free carbonic acid. It must be a fine powder, in order, so to speak, that, with proper distribution, each minute quantity of flour may be brought into juxtaposition with a particle of acid and a particle of bicarbonate of soda, so that, upon the application of moisture, the carbonic acid of the bicarbonate of soda shall be so uniformly liberated throughout the entire mass of the dough that it shall secure a uniform finely porous structure throughout the loaf. It must be a homogeneous powder—that is, all particles must have a like acidity—in order that the decomposition of the alkaline carbonates shall be uniform, and thus prevent portions of the bread from becoming dark colored, heavy, and alkaline by the action of undecomposed bicarbonate, while certain other portions may become sour on account of uncombined acid.

That the preparation must be unobjectionable on account of color, taste, and smell is obvious. Its healthfulness, its freedom from poisonous ingredients, such as sulphate of lead, (which is a constant ingredient in the oil of vitriol employed in the manufacture, and which must of necessity be especially removed,) is indispensable.

My invention accomplishes all these results. By means of these results I have been enabled to avail myself of the valuable properties of phosphoric acid as an ingredient in the raising of bread without fermentation, and thereby to restore to the flour the phosphates, which are, to a great degree, lost in removing the bran in the process of bolting, and which are normal and essential elements of healthful food.

The acidified mixture above described as acid phosphate, or acid phosphate and free phosphoric acid, I have called "pulverulent phosphoric acid." The acid agent which this preparation places in available condition is phosphoric acid, as tartaric acid is the available acid agent in cream-tartar, and this is used as a substitute for tartaric acid or cream-tartar to decompose alkaline carbonates, as stated above, in the well-known process of making bread, cake, &c., without the use of ferment.

1. I claim, as a new manufacture, the above-described pulverulent phosphoric acid.

2. I claim the manufacture of the above-described pulverulent phosphoric acid, so that it may be applied in the manner and for the purposes above described.

3. I claim the mixing, in the preparation of farinaceous food, with flour, of a powder or powders, such as described, consisting of ingredients of which phosphoric acid, or acid phosphates and alkaline carbonates, are the active agents for the purpose of liberating carbonic acid, as described, when subjected to moisture or heat, or both.

4. The use of phosphoric acid or acid phosphates, when employed with alkaline carbonates, as a substitute for ferment or leaven in the preparation of farinaceous food.

In testimony whereof I, EBEN N. HORSFORD, President of the Rumford Chemical Works, have hereunto affixed my signature in presence of two witnesses.

E. N. HORSFORD,
*President Rumford Chemical Works.*

Witnesses:
A. POLLOK,
HENRY REDFIELD.